(12) United States Patent
Hickman

(10) Patent No.: US 12,044,221 B1
(45) Date of Patent: Jul. 23, 2024

(54) DUAL PROPELLANT MICROWAVE ELECTROTHERMAL PROPULSION SYSTEMS

(71) Applicant: Robert Alan Hickman, Chapel Hill, NC (US)

(72) Inventor: Robert Alan Hickman, Chapel Hill, NC (US)

( * ) Notice: Subject to any disclaimer, the term of this patent is extended or adjusted under 35 U.S.C. 154(b) by 16 days.

(21) Appl. No.: 18/192,144

(22) Filed: Mar. 29, 2023

(51) Int. Cl.
 *F03H 1/00* (2006.01)
 *B64G 1/40* (2006.01)

(52) U.S. Cl.
 CPC ......... *F03H 1/0093* (2013.01); *F03H 1/0012* (2013.01); *B64G 1/402* (2013.01); *B64G 1/411* (2023.08); *F03H 1/0018* (2013.01)

(58) Field of Classification Search
 CPC .... F03H 1/0093; F03H 1/0018; F03H 1/0012; B64G 1/402; B64G 1/411
 See application file for complete search history.

(56) References Cited

U.S. PATENT DOCUMENTS

| | | | | |
|---|---|---|---|---|
| 5,956,938 A | * | 9/1999 | Brandenburg | ........ F03H 1/0093 60/203.1 |
| 6,205,769 B1 | * | 3/2001 | Brandenburg | ........ F03H 1/0093 60/203.1 |
| 7,037,484 B1 | * | 5/2006 | Brandenburg | ......... B01J 19/088 204/157.52 |
| 7,628,962 B1 | * | 12/2009 | Brandenburg | .......... C01B 3/047 422/186 |
| 11,527,387 B2 | | 12/2022 | Hummelt et al. | |

* cited by examiner

*Primary Examiner* — William H Rodriguez
(74) *Attorney, Agent, or Firm* — LeonardPatel PC; Michael A. Leonard, II; Sheetal S. Patel

(57) ABSTRACT

Dual propellant electrothermal propulsion systems with a polar propellant and a non-polar propellant are disclosed. Such a system may be used for imparting high specific impulse momentum on a spacecraft. A thruster includes a microwave source operably coupled to a heating chamber. An injector mixes polar and non-polar propellants and a nozzle at one end of the heating chamber. The thruster raises the temperature of the mixed propellants that exit the heating chamber to expand in the nozzle to generate thrust.

20 Claims, 5 Drawing Sheets

DUAL PROPELLANT MICROWAVE ELECTROTHERMAL PROPULSION SYSTEMS

FIELD

The present invention generally pertains to propulsion for spacecraft, and more particularly, to dual propellant electrothermal propulsion systems that are configured to heat a mixture of polar and non-polar propellants for expulsion from a thruster using microwaves.

BACKGROUND

Current rocket propulsion systems generate thrust by accelerating propellant, either by heating a gas and allowing it to expand through a converging-diverging nozzle or by generating a plasma that is accelerated by a magnetic field. The former is commonly referred to "thermal propulsion" the latter is commonly referred to as "ion propulsion." In thermal propulsion the gas can be heated by the energy released in an exothermic reaction (chemical thermal propulsion), the energy can be imparted by focused solar electromagnetic radiation (solar thermal propulsion), or the energy can be supplied by an electric current (electrothermal propulsion). The effectiveness of a thermal propulsion system in terms of specific impulse is a function of the exhaust velocity of the propellants. In thermal propulsion, the maximum achievable exhaust velocity is given by:

$$\text{Maximum Exhaust Velocity} = (2g_c c_p T_0)^{0.5} \quad (1)$$

where $g_c$ is the gravitational constant, $c_p$ is the specific heat of the propellant, and $T_0$ is the propellant temperature.

The ability of materials to sustain high temperatures limits all thermal propulsion systems to operating temperatures less than 6000° Rankine (R). For the best available propellants (liquid hydrogen ($LH_2$)/liquid oxygen ($LO_2$)), chemical thermal propulsion can achieve a maximum exhaust velocity of around 15,000 feet per second (ft/sec) and can generate high thrust levels. To conduct missions requiring a spacecraft with high velocity, such a mission to Mars, a system with a higher exhaust velocity is desirable.

Exhaust velocity is highest if the propellant has a high $c_p$. Hydrogen gas has the highest known $c_p$ and can achieve an exhaust velocity of 36,000 ft/sec if heated to 6000° R. The question, however, is how to heat the hydrogen. Arcjet thrusters have been developed using hydrogen. However, arcjet thrusters have very limited thrust and are not very energy efficient. Solar thermal designs have also been produced, but have a number of technical challenges to overcome. These technical challenges include constantly positioning the solar concentrator to focus the solar energy on the heat exchanger and developing a heat exchanger that can withstand very high temperatures, be a good absorber, and not radiate too much heat away. Accordingly, an improved and/or alternative propulsion system may be beneficial.

SUMMARY

Certain embodiments of the present invention may be implemented and provide solutions to the problems and needs in the art that have not yet been fully solved by existing propulsion systems, or provide a useful alternative thereto. For example, some embodiments pertain to dual propellant electrothermal propulsion systems that are configured to heat a mixture of polar and non-polar propellants for expulsion from a thruster using microwaves.

In an embodiment, a dual propellant electrothermal propulsion system includes a heating chamber and one or more microwave generators operably connected to the heating chamber. The dual propellant electrothermal propulsion system also includes a power source configured to provide power to the one or more microwave generators, a first propellant tank configured to store a polar propellant, a second propellant tank configured to store a non-polar propellant, and an injector configured to mix and inject the polar propellant and the non-polar propellant into the heating chamber to be heated via the one or more microwave generators. The dual propellant electrothermal propulsion system further includes a first pump operably connected to the first propellant tank and the injector. The first pump is configured to provide the polar propellant to the heating chamber via the injector. Additionally, the dual propellant electrothermal propulsion system includes a second pump operably connected to the second propellant tank and the injector. The second pump is configured to provide the non-polar propellant to the heating chamber via the injector.

In another embodiment, a dual propellant electrothermal propulsion system includes a heating chamber and one or more microwave generators operably connected to the heating chamber. The dual propellant electrothermal propulsion system also includes a power source configured to provide power to the one or more microwave generators and an injector configured to mix and inject a polar propellant and a non-polar propellant into the heating chamber to be heated via the one or more microwave generators. The dual propellant electrothermal propulsion system further includes a first pump operably connected to the injector. The first pump is configured to provide the polar propellant to the heating chamber via the injector. Additionally, the dual propellant electrothermal propulsion system includes a second pump operably connected to the injector. The second pump is configured to provide the non-polar propellant to the heating chamber via the injector. The dual propellant electrothermal propulsion system also includes a computing system configured to control the first pump, the second pump, and the power source to control amounts of the polar propellant and the non-polar propellant that reach the injector and to control an amount of power provided to each microwave generator of the one or more microwave generators.

In yet another embodiment, a dual propellant electrothermal propulsion system includes a heating chamber and one or more microwave generators operably connected to the heating chamber. The dual propellant electrothermal propulsion system also includes an injector configured to mix and inject a polar propellant and a non-polar propellant into the heating chamber to be heated via the one or more microwave generators. The injector includes a central cavity configured to receive one of the polar propellant and the non-polar propellant and a peripheral cavity configured to receive the other of the polar propellant and the non-polar propellant.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
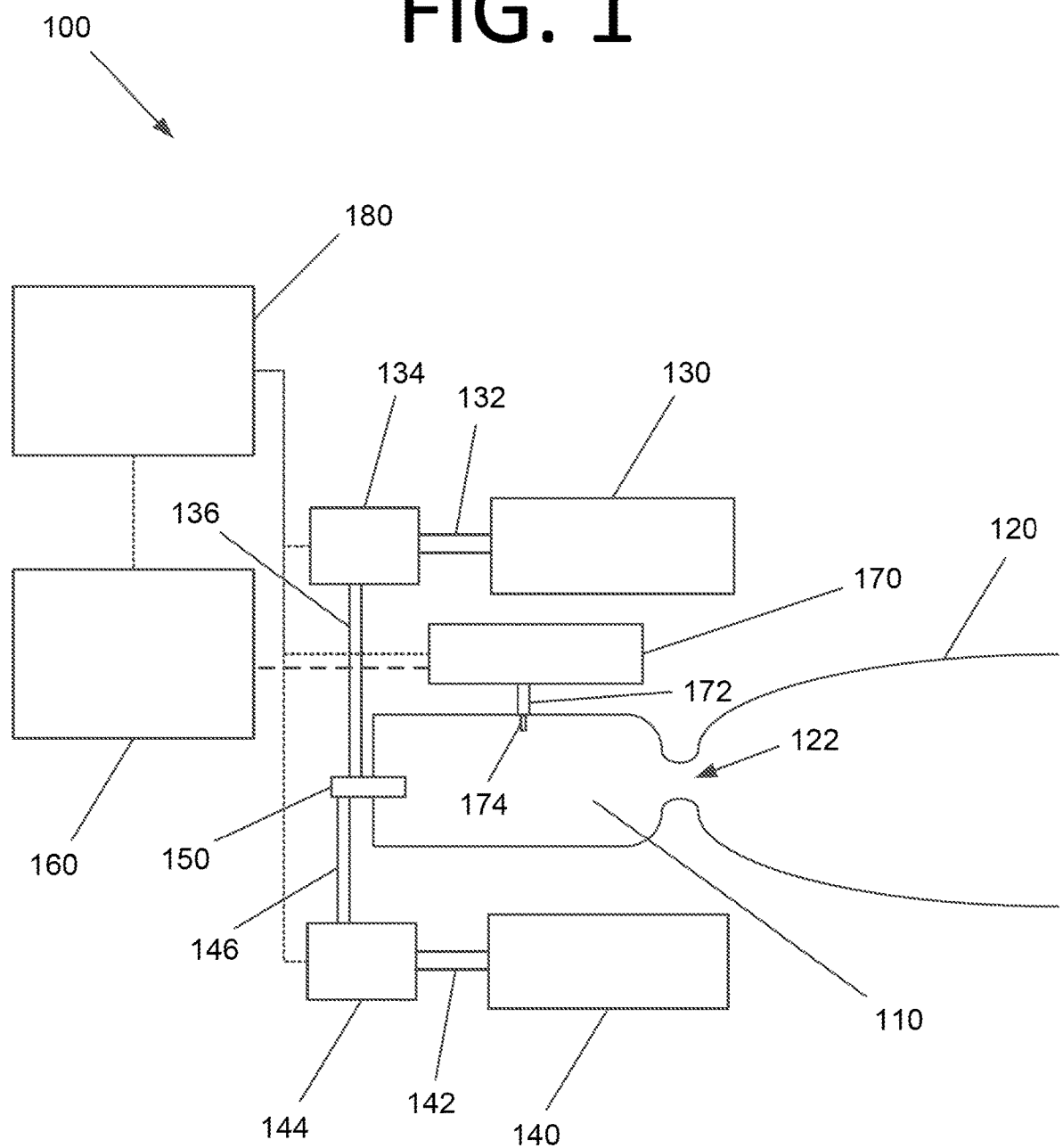
FIG. 1 is a schematic illustrating a dual propellant microwave thruster and related components, according to an embodiment of the present invention.

Some embodiments of the present invention pertain to dual propellant electrothermal propulsion systems that are configured to heat a mixture of polar and non-polar propellants for expulsion from a thruster using microwaves. Such propulsion systems may be used for imparting high specific impulse momentum on a spacecraft. A thruster of some embodiments includes a microwave source operably coupled to a heating chamber. An injector mixes polar and non-polar propellants and a nozzle at one end of the heating chamber. The thruster raises the temperature of the mixed propellants that exit the heating chamber to expand in the nozzle to generate thrust.

Hydrogen is a non-polar gas that is used as the non-polar propellant in some embodiments since hydrogen can generate the highest known maximum exhaust velocity for a given temperature. A polar fluid such as water, is mixed with hydrogen to produce a composite fluid that can be heated using microwaves. The fluids are mixed by flowing through an injector in some embodiments. The microwave generator of some embodiments receives its power from a power source that can be an array of solar cells, a battery, a nuclear reactor, etc. The microwave generator is coupled to the heating chamber in some embodiments via a coaxial cable terminated by an antenna or a waveguide. In embodiments using the coaxial cable, the heating chamber should be a resonant cavity. The achievable exhaust velocity is limited by the fluid temperature in the heating chamber. The maximum chamber temperature is limited by the thermal environment the chamber and nozzle materials can withstand. Ultra-high temperature ceramics, such as halfium carbide, have a melting point in excess of 6000° R. The operating temperature of the heating chamber can be increased by using the thruster propellants to cool the heating chamber in some embodiments, thereby increasing the exhaust velocity potential.

A more practical and efficient way to heat a gas than arcjet or solar thermal techniques is with microwaves. However, microwaves can only heat polar molecules, such as water. $H_2$ and most other paired gasses, such as $O_2$ and $N_2$, are non-polar. To address this issue, some embodiments mix a non-polar gas, such as hydrogen, with a polar gas to enable the resulting gas mixture to be heated by microwaves. As the polar molecules in the mixture are excited, heat transfers via convection to the surrounding non-polar molecules. Water ($H_2O$) is an example of a polar molecule that can be mixed with the polar molecule to enable the gas mixture to be heated by microwaves. When mixed with a polar gas such as hydrogen, the $c_p$ of the mixed gas is lower than the $c_p$ of hydrogen alone, for example. However, if the percentage of water is below 15%, exhaust velocities exceeding 32,000 ft/sec can still be achieved. As the percentage of water increases, the exhaust velocity continues to drop toward that of purely chemical thermal propulsion, which occurs around 80% water (i.e., approximately equal to the chemical propulsion exhaust velocity using $H_2$ and $O_2$ as fuel).

In some embodiments, both the polar and non-polar gases, which may be in liquid form when stored in the propulsion system, enter an injector that facilitates mixing of the propellants. Regenerative cooling in which the fluids are circulated around the heating chamber to cool the chamber walls can be used to provide gas temperatures above 6000° R. This allows exit velocities even higher than 36,000 ft/sec to be achieved.

FIG. 1 is a schematic illustrating a dual propellant microwave thruster 100 and related components, according to an embodiment of the present invention. A heating chamber 110 is connected to a nozzle 120. Mixed propellant exits heating chamber 110 and enters nozzle 120 via converging portion 122. Polar propellant is stored in polar propellant tank 130 and enters pump 134 via a propellant tank line 132. Similarly, non-polar propellant is stored in non-polar propellant tank 140 and enters pump 144 via a propellant tank line 142. Pumps 134, 144 pump the polar propellant and nonpolar propellant through propellant pump lines 136, 146, respectively, to an injector 150 where the polar propellant and non-polar propellant are mixed and injected into heating chamber 110.

A power source 160 provides electric power to a microwave generator 170. Microwave generator 170 is coupled to heating chamber 110 via a coaxial cable 172. Coaxial cable 172 terminates in an antenna or waveguide 174, which transmits microwaves into heating chamber 110. While a single microwave generator is shown in FIG. 1 for illustration purposes, any desired number and configuration of microwave generators, and/or any desired number and configuration of coaxial cables and antennas or waveguides, may be used without deviating from the scope of the invention. Mixed polar and non-polar propellant is heated in heating chamber 110 due to the microwaves exciting the polar propellant, and the hot, energetic mixed propellant particles exit dual propellant microwave thruster 100 via nozzle 120, generating thrust. A computing system 180 controls the operation of pumps 134, 144, power source 160, and microwave generator 170. In some embodiments, computing system 180 may be computing system 400 of FIG. 4.

The polar propellant and non-polar propellant are pumped by pumps 134, 144, respectively, at pressures that are above the operating pressure of heating chamber 110. In some embodiments, the pressure is just above the operating pressure of heating chamber 110. For instance, in some embodiments, the operating pressure may be approximately 6,000 pounds per square inch (psi) and the propellant pressures may be approximately 6,100 psi. The pressure should be sufficient for the heated combined propellant to achieve Mach 1 in converging portion 122 of nozzle 120 and provide for sufficient expansion of the propellant gasses in nozzle 120.

Figure 2A:
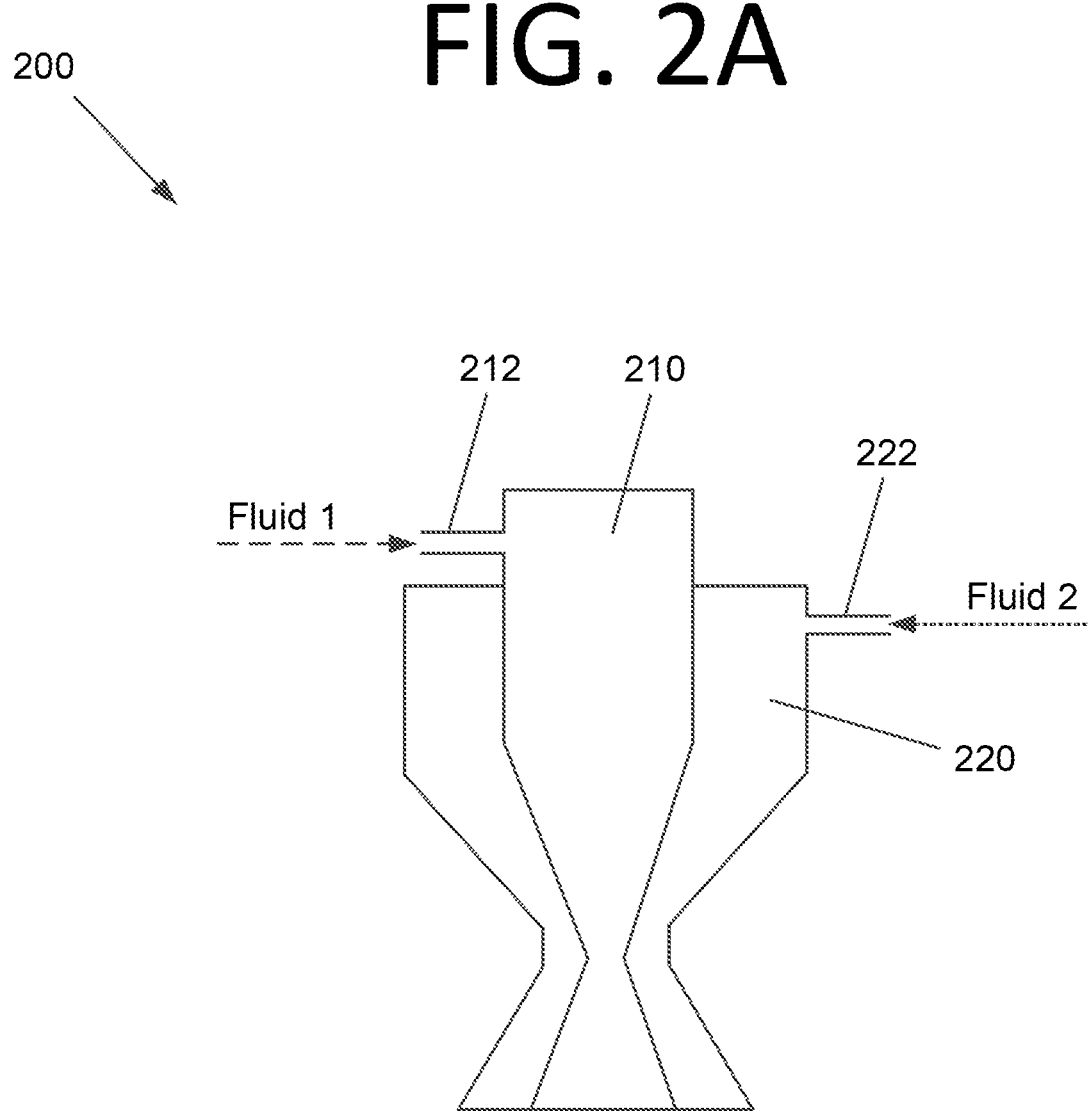
FIG. 2A is a vertical cross section view illustrating an injector of a dual propellant microwave thruster, according to an embodiment of the present invention.

FIG. 2A is a vertical cross section view illustrating an injector 200 of a dual propellant microwave thruster, according to an embodiment of the present invention. In some embodiments, injector 200 is injector 150 of FIG. 1. Either the polar or non-polar propellant fluid enters a central cavity 210 via an inlet 212. The other propellant fluid enters a peripheral cavity 220 via an inlet 222. The goal of injector 200 in some embodiments is to achieve optimum mixing of the polar and non-polar propellant fluids.

Figure 2B:
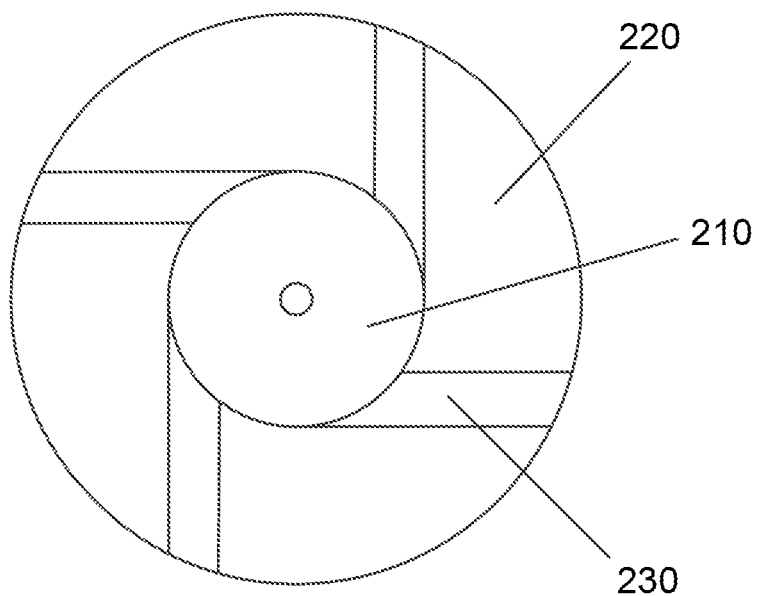
FIG. 2B is a horizontal cross section view illustrating the injector with swirl vanes visible, according to an embodiment of the present invention.

Turning to FIG. 2B, swirl vanes 230 are visible. Swirl vanes 230 are installed in peripheral cavity 220 of injector 200. Swirl vanes 230 add angular momentum to the fluid flow therethrough to achieve better mixing of the propellant fluids. The centrifugal forces acting on a rotating column of gas will concentrate hotter and less dense gasses along the axis of rotation while cooler and more dense gasses will be pushed toward the chamber walls (e.g., heating chamber 110 of FIG. 1). This reduces the amount of heat that the chamber walls must withstand.

Figure 3:
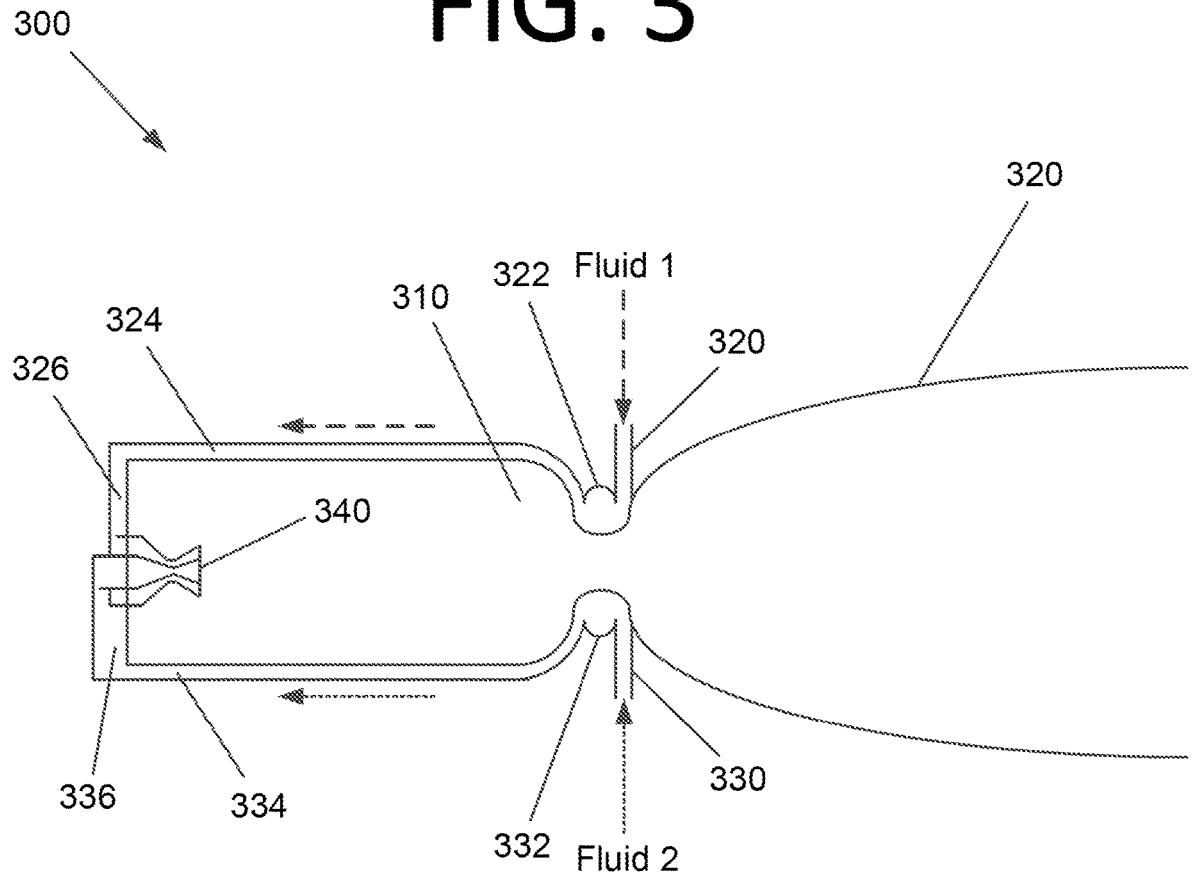
FIG. 3 is a cross sectional view illustrating a thruster with regenerative cooling, according to an embodiment of the present invention.

FIG. 3 is a cross sectional view illustrating thruster 300 with regenerative cooling, according to an embodiment of the present invention. In some embodiments, thruster 300 may be thruster 100 of FIG. 1. Thruster 300 includes a heating chamber 310 and a nozzle 320. Fluid 1 enters inlet 320 and travels to lower fluid header 322. Similarly, fluid 2 enters inlet 330 and travels to lower fluid header 332. Lower fluid headers 322, 332 are fluid cavities where the fluid is injected and directed to fluid channels 324, 334, which are adjacent to the walls of heating chamber 310.

The fluids flow through fluid channels 324, 334 to reach upper fluid headers 326, 336, respectively, which are fluid cavities that receive the fluid from fluid channels 324, 334. Heat is transferred to the fluids from heating chamber 310 and nozzle 320 as they traverse fluid channels 324, 334, cooling heating chamber 310. Fluids 1 and 2 enter the peripheral cavity and central cavity, respectively of an injector 340. In some embodiments, injector 340 may be injector 150 and/or 200 of FIGS. 1 and 2A and 2B, respectively.

Figure 4:
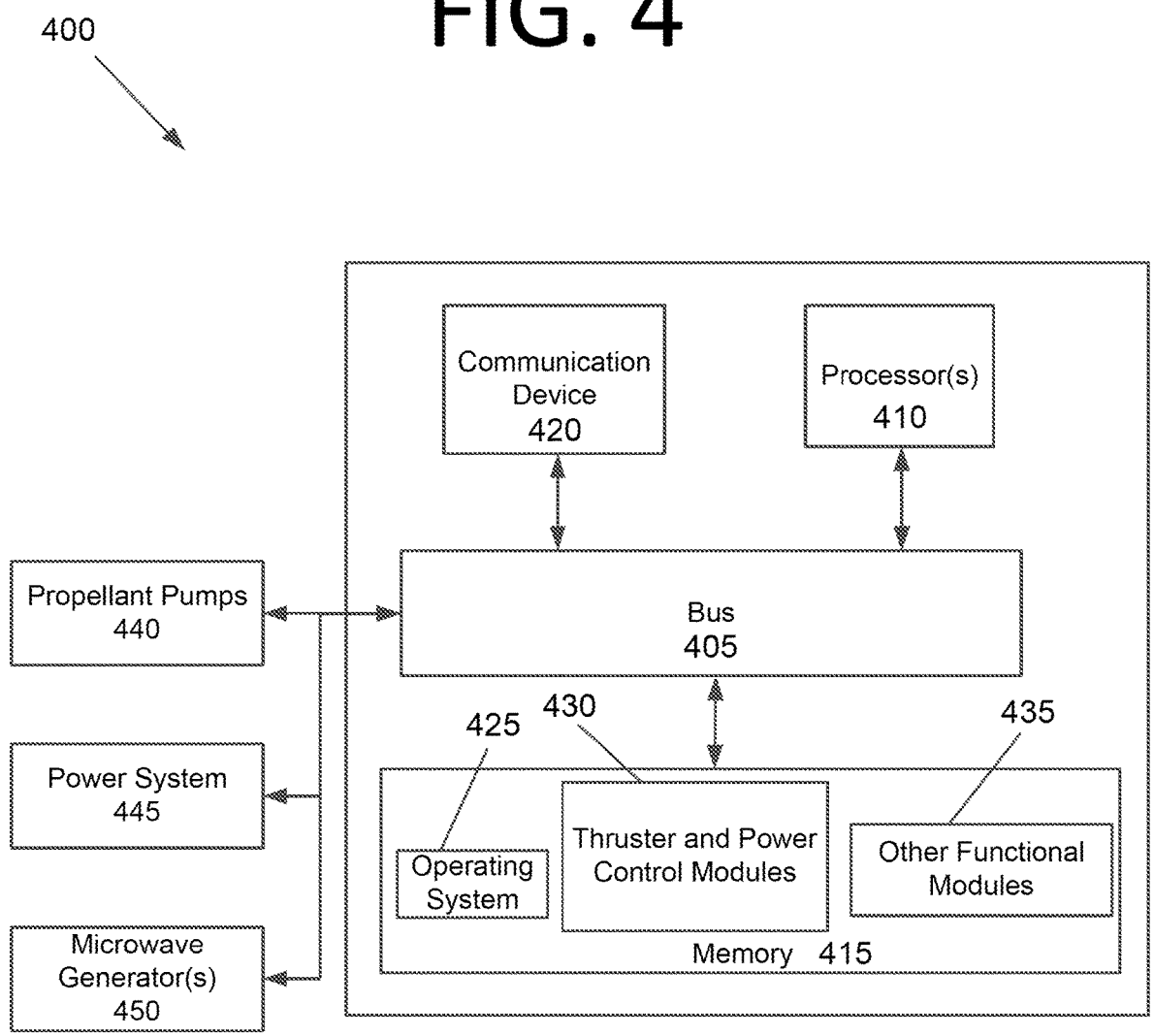
FIG. 4 is a block diagram illustrating a computing system configured to control a dual propellant microwave thruster, according to an embodiment of the present invention.

FIG. 4 is a block diagram illustrating a computing system 400 configured to control a dual propellant microwave thruster, according to an embodiment of the present invention. Computing system 400 includes a bus 405 or other communication mechanism for communicating information, and processor(s) 410 coupled to bus 405 for processing information. Processor(s) 410 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 410 may also have multiple processing cores, and at least some of the cores may be configured to perform specific functions. Multi-parallel processing may be used in some embodiments. In certain embodiments, at least one of processor(s) 410 may be a neuromorphic circuit that includes processing elements that mimic biological neurons. In some embodiments, neuromorphic circuits may not require the typical components of a Von Neumann computing architecture.

Computing system 400 further includes memory 415 for storing information and instructions to be executed by processor(s) 410. Memory 415 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 410 and may include volatile media, non-volatile media, or both. The media may also be removable, non-removable, or both.

Additionally, computing system 400 includes a communication device 420, such as a transceiver, to provide access to a communications network via a wireless and/or wired connection. In some embodiments, communication device 420 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 420 may include one or more antennas that are singular, arrayed, phased, switched, beamforming, beam-steering, a combination thereof, and or any other antenna configuration without deviating from the scope of the invention.

Memory 415 stores software modules that provide functionality when executed by processor(s) 410. The modules include an operating system 425 for computing system 400. The modules further include thruster and power control modules 430 that are configured to control the heating chamber temperature and pressure by controlling propellant speeds via propellant pumps 440, as well as regulate power from a power source 445 to microwave generator(s) 450. Computing system 400 may include one or more additional functional modules 435 that include additional functionality.

One skilled in the art will appreciate that a "computing system" could be embodied as an embedded computing system, a flight computer, a microcontroller, an FPGA, or any other suitable computing device, or combination of devices without deviating from the scope of the invention. Presenting the above-described functions as being performed by a "computing system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN) for space vehicles, a mesh network, a satellite communications network, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as FPGAs, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A dual propellant electrothermal propulsion system, comprising:
    a heating chamber;
    one or more microwave generators operably connected to the heating chamber;
    a power source configured to provide power to the one or more microwave generators;
    a first propellant tank configured to store a polar propellant;
    a second propellant tank configured to store a non-polar propellant;
    an injector configured to mix and inject the polar propellant and the non-polar propellant into the heating chamber to be heated via the one or more microwave generators;
    a first pump operably connected to the first propellant tank and the injector, the first pump configured to provide the polar propellant to the heating chamber via the injector; and
    a second pump operably connected to the second propellant tank and the injector, the second pump configured to provide the non-polar propellant to the heating chamber via the injector.

2. The dual propellant electrothermal propulsion system of claim 1, wherein the polar propellant is water ($H_2O$) and the non-polar propellant is liquid hydrogen ($H_2$).

3. The dual propellant electrothermal propulsion system of claim 1, further comprising:
    a computing system configured to control the first pump, the second pump, and the power source to control amounts of the polar propellant and the non-polar propellant that reach the injector and to control an amount of power provided to each microwave generator of the one or more microwave generators.

4. The dual propellant electrothermal propulsion system of claim 3, wherein the computing system, via the first pump and the second pump, is configured to control the amount of the polar propellant in the mixed propellant provided by the injector to be above 0%, but below 15%.

5. The dual propellant electrothermal propulsion system of claim 1, further comprising:
a nozzle operably connected to the heating chamber, wherein
the dual propellant thruster system, via the one or more microwave generators, is configured to generate mixed propellant temperatures of over 6000° Rankine (R) and exit velocities of the mixed propellant from the nozzle of over 36,000 feet per second.

6. The dual propellant electrothermal propulsion system of claim 1, further comprising:
a coaxial cable terminating in an antenna or a waveguide for each of the one or more microwave generators, the antenna or the waveguide coupled to the heating chamber and configured to inject microwaves from the respective microwave generator into the heating chamber.

7. The dual propellant electrothermal propulsion system of claim 6, wherein the heating chamber is a resonant cavity.

8. The dual propellant electrothermal propulsion system of claim 1, wherein the injector comprises:
a central cavity configured to receive one of the polar propellant and the non-polar propellant; and
a peripheral cavity configured to receive the other of the polar propellant and the non-polar propellant.

9. The dual propellant electrothermal propulsion system of claim 8, wherein
the peripheral cavity further comprises a plurality of swirl vanes, and
the plurality of swirl vanes are configured to impart angular momentum to fluid flowing therethrough, causing centrifugal forces to concentrate hotter and less dense gasses along an axis of rotation and push cooler and more dense gasses toward walls of the heating chamber, reducing an amount of heat that reaches the walls of the heating chamber.

10. The dual propellant electrothermal propulsion system of claim 1, further comprising:
a first fluid channel located proximate to walls of the heating chamber and configured to transport one of the polar propellant and the non-polar propellant to the injector; and
a second fluid channel located proximate to the walls of the heating chamber and configured to transport the other of the polar propellant and the non-polar propellant to the injector, wherein
propellant flow through the first fluid channel and the second fluid channel is configured to cool the heating chamber.

11. A dual propellant electrothermal propulsion system, comprising:
a heating chamber;
one or more microwave generators operably connected to the heating chamber;
a power source configured to provide power to the one or more microwave generators;
an injector configured to mix and inject a polar propellant and a non-polar propellant into the heating chamber to be heated via the one or more microwave generators;
a first pump operably connected to the injector, the first pump configured to provide the polar propellant to the heating chamber via the injector;
a second pump operably connected to the injector, the second pump configured to provide the non-polar propellant to the heating chamber via the injector; and
a computing system configured to control the first pump, the second pump, and the power source to control amounts of the polar propellant and the non-polar propellant that reach the injector and to control an amount of power provided to each microwave generator of the one or more microwave generators.

12. The dual propellant electrothermal propulsion system of claim 11, wherein the computing system, via the first pump and the second pump, is configured to control the amount of the polar propellant in the mixed propellant provided by the injector to be above 0%, but below 15%.

13. The dual propellant electrothermal propulsion system of claim 11, further comprising:
a nozzle operably connected to the heating chamber, wherein
the dual propellant thruster system, via the one or more microwave generators, is configured to generate mixed propellant temperatures of over 6000° Rankine (R) and exit velocities of the mixed propellant from the nozzle of over 36,000 feet per second.

14. The dual propellant electrothermal propulsion system of claim 11, wherein the injector comprises:
a central cavity configured to receive one of the polar propellant and the non-polar propellant; and
a peripheral cavity configured to receive the other of the polar propellant and the non-polar propellant.

15. The dual propellant electrothermal propulsion system of claim 14, wherein
the peripheral cavity further comprises a plurality of swirl vanes, and
the plurality of swirl vanes are configured to impart angular momentum to fluid flowing therethrough, causing centrifugal forces to concentrate hotter and less dense gasses along an axis of rotation and push cooler and more dense gasses toward walls of the heating chamber, reducing an amount of heat that reaches the walls of the heating chamber.

16. The dual propellant electrothermal propulsion system of claim 11, further comprising:
a first fluid channel located proximate to walls of the heating chamber and configured to transport one of the polar propellant and the non-polar propellant to the injector; and
a second fluid channel located proximate to the walls of the heating chamber and configured to transport the other of the polar propellant and the non-polar propellant to the injector, wherein
propellant flow through the first fluid channel and the second fluid channel is configured to cool the heating chamber.

17. A dual propellant electrothermal propulsion system, comprising:
a heating chamber;
one or more microwave generators operably connected to the heating chamber; and
an injector configured to mix and inject a polar propellant and a non-polar propellant into the heating chamber to be heated via the one or more microwave generators, the injector comprising a central cavity configured to receive one of the polar propellant and the non-polar propellant and a peripheral cavity configured to receive the other of the polar propellant and the non-polar propellant.

18. The dual propellant electrothermal propulsion system of claim 17, further comprising:
   a first pump operably connected to the injector, the first pump configured to provide the polar propellant to the heating chamber via the injector;
   a second pump operably connected to the injector, the second pump configured to provide the non-polar propellant to the heating chamber via the injector; and
   a computing system configured to control the first pump and the second pump to control amounts of the polar propellant and the non-polar propellant that reach the injector and to control an amount of the polar propellant in the mixed propellant provided by the injector to be above 0%, but below 15%.

19. The dual propellant electrothermal propulsion system of claim 17, wherein
   the peripheral cavity further comprises a plurality of swirl vanes, and
   the plurality of swirl vanes are configured to impart angular momentum to fluid flowing therethrough, causing centrifugal forces to concentrate hotter and less dense gasses along an axis of rotation and push cooler and more dense gasses toward walls of the heating chamber, reducing an amount of heat that reaches the walls of the heating chamber.

20. The dual propellant electrothermal propulsion system of claim 17, further comprising:
   a first fluid channel located proximate to walls of the heating chamber and configured to transport one of the polar propellant and the non-polar propellant to the injector, and
   a second fluid channel located proximate to the walls of the heating chamber and configured to transport the other of the polar propellant and the non-polar propellant to the injector, wherein
   propellant flow through the first fluid channel and the second fluid channel is configured to cool the heating chamber.

* * * * *